3,218,132
RADIOACTIVE PHOSPHORUS PROCESS
Geoffrey Irving Gleason, Oak Ridge, Tenn., assignor to Abbott Laboratories, North Chicago, Ill., a corporation of Illinois
No Drawing. Filed May 24, 1963, Ser. No. 282,879
4 Claims. (Cl. 23—223)

This invention relates to a process for recovering radioactive phosphorus from neutron-irradiated sulfur. More particularly, it relates to a process for dispersing neutron-irradiated sulfur in water-miscible solvent and separating purified $P^{32}$ by ion-exchange means.

Solvent dispersal of irradiated sulfur to enable the separation of $P^{32}$ therefrom has been suggested heretofore. However, because the suggested processes use polyphase systems and highly unstable and reactive solvents there has been little commercial interest in them, as they are not adaptable to safe and simple remote conditions necessarily used in the processing of radioactive isotopes. In addition to the necessity for such solvents to be adaptable to trouble-free and safe reaction conditions, high chemical stability is most important because of the unavoidable action of the intense beta radiation on the solvent while the target material is being processed.

Therefore, an important object of this invention is provision of a simple process employing a single phase solvent system suitable for practical use under remote conditions for recovering high yields of purified radioactive phosphorus. Other objects and advantages of this invention will appear throughout the following description.

In accordance with certain aspects of this invention a suitable water-miscible di lower alkyl amide is employed as a solvent for dissolving neutron-irradiated sulfur and associated radioactive phosphorus. The sulfur solution is cooled to cause precipitation of a major portion of the sulfur while the $P^{32}$ remains in solution. The solution is then brought into contact with suitable anion exchange resin to cause adsorption of its phosphorus values. The adsorbed sulfur-free purified phosphorus is eluted from the resin by non-oxidizing acid.

Neutron-irradiation of $S^{32}$ causes its transformation into phosphorus according to the reaction $S^{32}(n,p)P^{32}$. Ordinarily this is accomplished by placing purified sulfur target material, commonly enclosed in a quartz or aluminum capsule, in the fast flux of a nuclear reactor. Fast flux is taken to mean a neutron flux in excess of 2 mev. This reaction and variations and modifications of it are well known to the art.

After irradiation the sulfur target material is removed from its container and is mixed with suitable water-miscible solvent to prepare a solution thereof. It is necessary that all phosphorus in the material be dissolved while it is only desirable to dissolve all the sulfur. A suitable solvent is one that is water-miscible, dissolves at least moderate quantities of sulfur when it is heated to temperatures below its boiling point and in which sulfur is at most only sparingly soluble at room temperatures.

It has been found that water-miscible amides having the formula

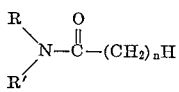

in which R and R' represent alkyl groups, either similar or dissimilar, of 1 to 3 carbons and $n$ is an integer of 0 to 2, are exceptionally useful solvents for the present process. Although dimethylformamide and dimethylacetamide are particularly suitable, examples of other compounds within this group which are also suitable are the following: dimethylpropamide, ethylmethylformamide, dimethyacetamide, ethylmethylacetamide, diethylformamide, methylpropylformamide, dipropylformamide, ethylpropylacetamide, and methylpropylpropamide. Various procedures for the preparation of these solvents have been reported in the literature. For example, dimethylformamide is conveniently formed from dimethylaniline and formic acid according to the method reported in J. Am. Chem. Soc., 53:1879. Dimethylacetamide may be prepared from dimethylformamide and acetic anhydrate by the process reported in J. Am. Chem. Soc., 76:1632. Comparable processes are employed for other compounds in the series.

A volume of solvent capable of dissolving substantially all of the target material at temperatures below the boiling point of the mixture should be made available. A convenient volume of dimethylformamide is one having about 30 times that of the sulfur to be dispersed. After mixing of the target material in the water-miscible solvent the solvent is heated to a temperature below its boiling point but at which the irradiated sulfur is essentially dissolved. Ordinarily a temperature of about 80° to about 120° C. will be most suitable. After the sulfur is in solution, temperature of the solution is reduced to below 80°, preferably to about room temperature, to cause crystallization of more than about 90% of the sulfur while the phosphorus remains in solution. Preferably to cause precipitation of additional material the solution is further diluted with water after the major portion of the sulfur has been removed following cooling. By adding, for example, a 20% additional volume of water after the initial precipitation, more sulfur is crystallized to reduce content of the solution to about 0.1 mg. of sulfur per ml. of solvent.

This procedure offers a rapid one-step separation of about 97.5% sulfur from the desired phosphorus isotope. The remaining sulfur-depleted solution containing the phosphorus values is passed through an anion exchange bed in free base form. Ordinarily the bed is prepared in water and rinsed with the water-miscible solvent used to prepare the original solution of target material. Passage of the solution causes $P^{32}$ to be retained on the resin of the non-ionic sulfur.

Preferably weakly basic exchange resins such as the polyamine types will be used. Examples of suitable resins within this class are those available under the trademarks Duolite A2 and A4, converted to the free base form with aluminum hydroxide, and Dowex 3. Although weakly basic resins are ordinarily preferred in typical processes, strongly basic resins such as trimethylate or dimethylethanolated quaternary ammonium types in the free base cycle are useful. If a strongly basic exchanger is used a higher concentration of elutriant acid is required and for this reason the weakly basic materials are preferred. The ion exchange material should be inert to the solvent to minimize loss of ion exchange material and to improve phosphorus yields.

Technique variations such as use of a moving bed, batch or column operations which may be preferred under particular circumstances are well within the purview of those skilled in the art.

The bed is typically prepared in water and rinsed with amide solvent originally present in the liquid preparation. The grossly desulfured solution of phosphorus is passed through the exchange bed to cause non-ionic sulfur, usually present at a level of less than 0.2 mg./ml. of solution, to pass through into the effluent while the phosphorus, which is apparently primarily present as $P^{32}$ orthophosphate, is adsorbed at the top of the bed. Repeated washing of the column with fresh amide solvent will displace any sulfur residue. Following solvent washing, the bed is rinsed free of amide solvent with water. These rinsing procedures are not necessary but contribute to purity of the final product and are therefore desirable.

After removal of the sulfur traces and solvent from the ion exchange material phosphorus is eluted by a dilute solution of non-oxidizing acid. Although all types of such acids will suitably displace the adsorbed phosphate it is preferable to use an inexpensive acid which leaves an acceptable residue in conjunction with the phosphorus. Thus, if the $P^{32}$ is designed for certain uses, hydrochloric acid is a preferred elutriant because the chloride ion is physiologically acceptable and the eluate is directly useful for chemical or medical purposes. Although hydrochloric acid is eminently suitable other preferred acids are acetic, sulfuric, hydrobromic, citric and the like.

If the phosphorus is carrier-free, that is there are no stable atoms of the element added to the radioactive material, a recovery yield of about 87% may routinely be expected, while the addition of small quantities of carrier-phosphorus initially added as the orthophosphate to the solvent-sulfur mixture will bring efficiency of the recovery up to 99%.

The following specific examples are set forth for the purpose of illustrating the invention and should not be construed to limit the invention in precise ingredients and proportions shown.

*Example 1*

An aluminum capsule containing 10 gm. of purified sulfur which has been subjected to neutron-irradiation is mixed in 300 ml. of dimethylformamide. The mixture is heated with stirring to 120° C. to dissolve all of the sulfur. The solution is cooled to about 25° C., room temperature, to cause precipitation of sulfur. After precipitation 50 ml. of water in five 10 ml. portions is added to cause further sulfur precipitation. The solution is passed through a 1 by 20 cm. column of Duolite A4 anion exchange resin prepared with 80% dimethylformamide. The liquid in the column is then dispersed with dimethylformamide, followed by thorough washing with water to remove all solvent. The column is then washed with 50 ml. of 0.5 N HCl, yielding purified $P^{32}$ solution.

*Example 2*

The procedure of Example 1 is followed using diethylacetamide for the solvent in place of dimethylformamide.

While in the foregoing specification various embodiments of the invention have been given in detail, no unnecessary limitation should be understood therefrom as it will be appreciated by those skilled in the art, that this invention is susceptible to variation without departing from the spirit and scope thereof.

What is claimed is:
1. In the process of recovering radioactive phosphorus from neutron-irradiated sulfur the process comprising contacting irradiated sulfur with a liquid preparation containing water-miscible material having the formula

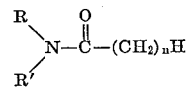

wherein R and R' represent alkyl groups having 1 to 3 carbon atoms and *n* is an integer of 0 to 2, in an amount sufficient to dissolve the sulfur therein at temperatures below the boiling point of the preparation, heating the preparation to dissolve the sulfur, cooling the resulting solution to precipitate at least a substantial portion of the sulfur, passing the cooled solution over an anion exchange resin in the free base form which is inert to the water-miscible material to thereby adsorb phosphorus contained in the solution, and eluting the phosphorus with aqueous solution of non-oxidizing acid.

2. In a process for recovering $P^{32}$ from neutron-irradiated sulfur the process comprising contacting irradiated sulfur containing an added quantity of carrier orthophosphate with a liquid preparation containing water-miscible material having the formula

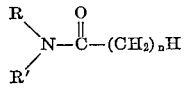

wherein R and R' represent alkyl groups having 1 to 3 carbon atoms and *n* is an integer of 0 to 2, in an amount sufficient to dissolve the sulfur therein at temperatures below the boiling point of the preparation, heating the preparation to temperatures of about 80° to 150° C. to dissolve the sulfur, cooling the resulting solution to about room temperature to precipitate at least a substantial portion of the sulfur, adding a portion of water to the cooled solution to precipitate further sulfur, passing the cooled solution over an anion exchange resin in the free base form which is inert to the water-miscible material to thereby adsorb phosphorus contained in the solution, and eluting the irradiated phosphorus with aqueous solution of hydrochloric acid.

3. The process of claim 1 wherein the solvent is dimethylformamide.

4. The process of claim 1 wherein the solvent is dimethylacetamide.

References Cited by the Examiner

UNITED STATES PATENTS

| | | | |
|---|---|---|---|
| 2,552,032 | 5/1951 | Booth | 23—223 X |
| 2,621,110 | 12/1952 | MacHutchin et al. | 23—224 X |
| 2,653,076 | 9/1953 | Cohn | 23—224 X |
| 3,023,088 | 2/1962 | Urban et al. | 23—224 |

FOREIGN PATENTS 656,936  9/1951  Great Britain.

MAURICE A. BRINDISI, *Primary Examiner.*